United States Patent [19]
Stoel et al.

[11] Patent Number: 5,907,715
[45] Date of Patent: May 25, 1999

[54] ENTERTAINMENT SYSTEM FOR COLLECTING USER INPUTS BY PERIODICALLY INTERLEAVING GAME COLLECTION INTERROGATIONS INTO SERIES OF SYSTEM INTERROGATIONS DURING INTERRUPTION OF SYSTEM INTERROGATIONS

[75] Inventors: Leon P. Stoel; David M. Bankers; Vernon E. Hills, all of Sioux Falls; Prentice J. Plucker, Chanceller; Christopher A. Cinco, Sioux Falls, all of S. Dak.

[73] Assignee: LodgeNet Entertainment Corporation, Sioux Falls, S. Dak.

[21] Appl. No.: 08/881,213

[22] Filed: Jun. 24, 1997

Related U.S. Application Data

[63] Continuation of application No. 08/757,851, Nov. 27, 1996, Pat. No. 5,675,828, which is a continuation of application No. 08/288,626, Aug. 10, 1994, Pat. No. 5,641,319.

[51] Int. Cl.⁶ .................................................. G06F 13/00
[52] U.S. Cl. ........................... 395/866; 395/867; 463/42; 463/25; 379/92.01
[58] Field of Search ....................... 348/13, 8, 3; 463/42, 463/25, 6; 379/91.02, 92.01; 395/866, 867

[56] References Cited

U.S. PATENT DOCUMENTS

| | | |
|---|---|---|
| Re. 34,611 | 5/1994 | Fenwick et al. .............................. 348/7 |
| 3,654,708 | 4/1972 | Brudner ..................................... 35/9 A |
| 3,833,765 | 9/1974 | Hilborn et al. ............................ 178/79 |
| 4,008,369 | 2/1977 | Theurer et al. ............................. 348/3 |
| 4,110,794 | 8/1978 | Lester et al. ............................. 358/256 |
| 4,337,480 | 6/1982 | Bourassin et al. ........................ 358/93 |
| 4,363,482 | 12/1982 | Goldfarb .............................. 273/1 GC |
| 4,477,069 | 10/1984 | Crudgington, Jr. .......................... 272/3 |
| 4,484,218 | 11/1984 | Boland et al. ............................. 358/86 |
| 4,494,197 | 1/1985 | Troy et al. ............................... 364/412 |

(List continued on next page.)

FOREIGN PATENT DOCUMENTS

| | | |
|---|---|---|
| 0 268 419 | 2/1988 | European Pat. Off. . |
| 0 277 014 A2 | 8/1988 | European Pat. Off. . |
| 0 542 664 A2 | 5/1993 | European Pat. Off. . |
| 0 631 247 A2 | 12/1994 | European Pat. Off. . |
| 0 647 914 A2 | 4/1995 | European Pat. Off. . |
| 2-13490 | 1/1990 | Japan . |
| 2-213374 | 8/1990 | Japan . |
| 2 151 054 | 7/1985 | United Kingdom . |

OTHER PUBLICATIONS

BT Vision, The Vision, 14 pages total.
W.K. Ritchie, TeMart, The Br Telecom Technol J., vol. 2, No. 4, Sep. 1984.
Gordon W. Kerr, On–demand Interactive Video On British Telecom's Switched–Star Network, pp. 127–134.
Fifth IEE Conference on 'Telecommunications', Mar. 26–29, 1995, "BT's Video On Demand Technology", Gordon Kerr, BT Labs, pp. 318–322.
GW Kerr, Br Telecom Technol J., vol. 4, No. 4, Oct. 1986, pp. 41–46.
Powter et al., The Westminster Cable TV System, Nov./Dec. 1986, pp. 798–800.

*Primary Examiner*—Le Hien Luu
*Attorney, Agent, or Firm*—Sheridan Ross P.C.

[57] ABSTRACT

A hotel room entertainment system enables video games to be played in each room of a hotel without providing a video game generator in each room. The entertainment system includes at a head end system portion in which the video game audio and video signals are generated and a plurality of guest terminals. Game interrogations are provided to each guest terminal in an active game-playing mode, each game interrogation having a plurality of response positions for guest terminal responses to the interrogation. The game interrogations are interleaved with a series of system interrogations generated at the head end system, enabling the entertainment system to provide video game signals along with other entertainment and services to the guest terminals using a single distribution system.

47 Claims, 7 Drawing Sheets

U.S. PATENT DOCUMENTS

| | | | |
|---|---|---|---|
| 4,521,014 | 6/1985 | Sitrick | 273/1 |
| 4,584,603 | 4/1986 | Harrison | 358/86 |
| 4,647,980 | 3/1987 | Steventon et al. | 358/254 |
| 4,709,418 | 11/1987 | Fox et al. | 455/612 |
| 4,738,451 | 4/1988 | Logg | 273/153 R |
| 4,747,043 | 5/1988 | Rodman | 364/200 |
| 4,769,833 | 9/1988 | Farleigh et al. | 379/105 |
| 4,866,515 | 9/1989 | Tagawa et al. | 358/86 |
| 4,905,280 | 2/1990 | Wiedemer | 380/16 |
| 4,920,432 | 4/1990 | Eggers et al. | 360/33.1 |
| 4,922,420 | 5/1990 | Nakagawa et al. | 364/410 |
| 4,926,327 | 5/1990 | Sidley | 364/412 |
| 4,947,244 | 8/1990 | Fenwick et al. | 358/86 |
| 4,958,381 | 9/1990 | Toyoshima | 455/4 |
| 4,965,568 | 10/1990 | Atalla et al. | 340/825.34 |
| 5,013,038 | 5/1991 | Luxenberg et al. | 273/439 |
| 5,036,314 | 7/1991 | Barillari et al. | 340/717 |
| 5,051,822 | 9/1991 | Rhoades | 463/25 |
| 5,120,076 | 6/1992 | Luxenberg et al. | 273/439 |
| 5,181,107 | 1/1993 | Rhoades | 358/86 |
| 5,186,460 | 2/1993 | Fongeallaz et al. | 463/6 |
| 5,193,208 | 3/1993 | Yokota et al. | 455/4.1 |
| 5,218,552 | 6/1993 | Stirk et al. | 364/492 |
| 5,251,909 | 10/1993 | Reed et al. | 273/439 |
| 5,289,272 | 2/1994 | Rabowsky et al. | 348/8 |
| 5,297,144 | 3/1994 | Gilbert et al. | 370/95.2 |
| 5,333,181 | 7/1994 | Biggs | 379/91.02 |
| 5,389,963 | 2/1995 | Lepley et al. | 348/7 |
| 5,396,225 | 3/1995 | Okada et al. | 340/825.21 |
| 5,410,343 | 4/1995 | Coddington et al. | 348/7 |
| 5,442,389 | 8/1995 | Blahut et al. | 348/7 |
| 5,455,619 | 10/1995 | Truckenmiller et al. | 348/8 |
| 5,488,411 | 1/1996 | Lewis | 348/8 |
| 5,488,412 | 1/1996 | Majeti et al. | 348/10 |
| 5,534,913 | 7/1996 | Majeti et al. | 348/7 |
| 5,539,449 | 7/1996 | Blahut et al. | 348/7 |
| 5,555,466 | 9/1996 | Scribner et al. | 348/8 |
| 5,559,549 | 9/1996 | Hendricks et al. | 348/6 |
| 5,570,126 | 10/1996 | Blahut et al. | 348/7 |
| 5,570,415 | 10/1996 | Stretton et al. | 379/110 |
| 5,577,735 | 11/1996 | Reed et al. | 273/439 |
| 5,581,270 | 12/1996 | Smith et al. | 345/2 |
| 5,592,212 | 1/1997 | Handelman | 348/12 |
| 5,594,936 | 1/1997 | Rebec et al. | 495/3.2 |
| 5,606,359 | 2/1997 | Youden et al. | 348/7 |
| 5,607,357 | 3/1997 | Kim et al. | 463/40 |
| 5,608,446 | 3/1997 | Carr et al. | 348/6 |
| 5,629,732 | 5/1997 | Moskowitz et al. | 348/7 |
| 5,638,426 | 6/1997 | Lewis | 379/90 |
| 5,641,319 | 6/1997 | Stoel et al. | 463/42 |
| 5,643,088 | 7/1997 | Vaughn et al. | 463/40 |
| 5,661,517 | 8/1997 | Budow et al. | 348/13 |

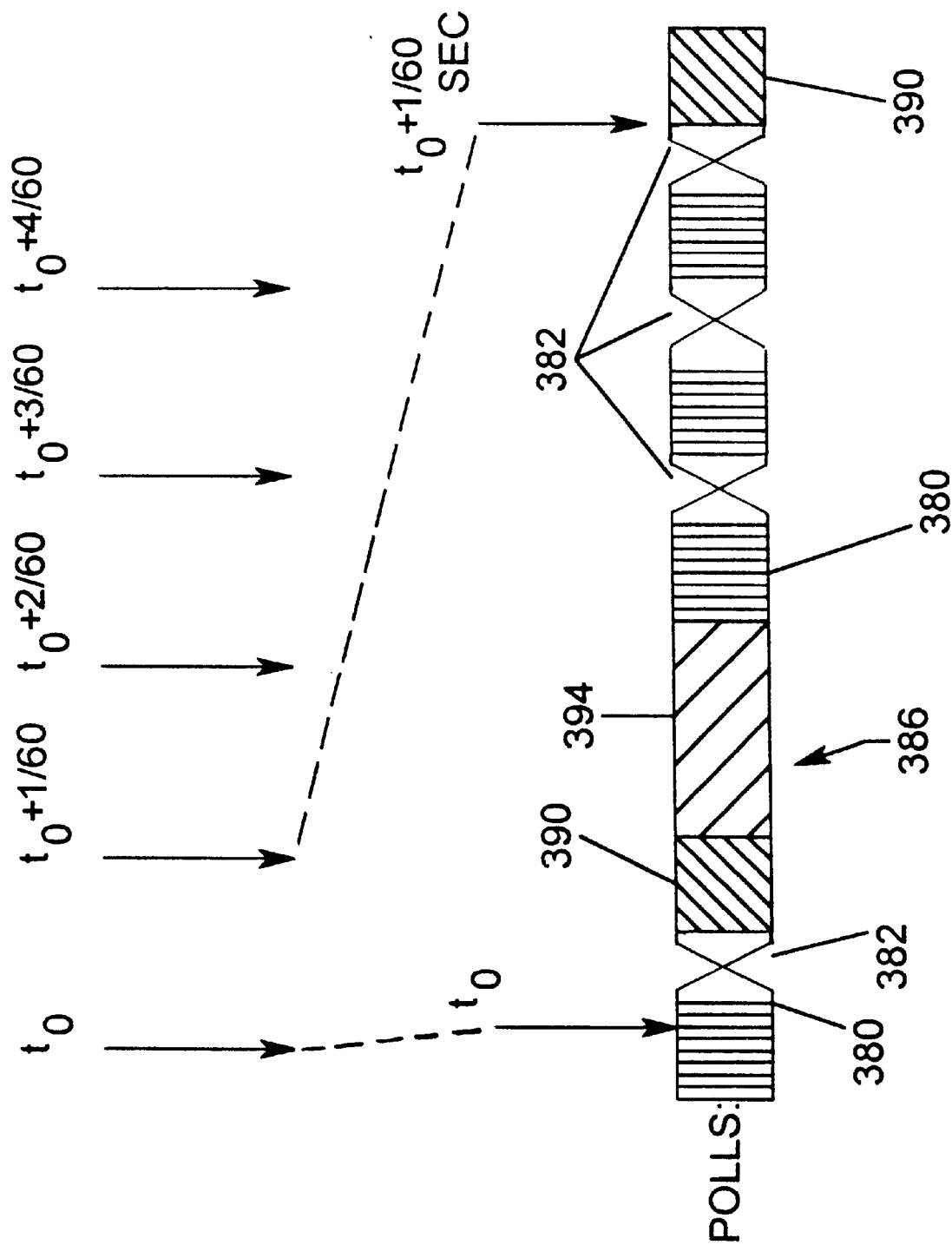

ENTERTAINMENT SYSTEM FOR COLLECTING USER INPUTS BY PERIODICALLY INTERLEAVING GAME COLLECTION INTERROGATIONS INTO SERIES OF SYSTEM INTERROGATIONS DURING INTERRUPTION OF SYSTEM INTERROGATIONS

This is a continuation of application Ser. No. 08/757,851, filed Nov. 27, 1996, U.S. Pat. No. 5,675,828, which in turn is a continuation of application Ser. No. 08/288,626 filed Aug. 10, 1994 U.S. Pat. No. 5,641,319.

BACKGROUND OF THE INVENTION

The present invention relates to hotel entertainment systems and, in particular, to a system for enabling video games to be played in each room of a hotel without the need to provide individual video game generators in each room.

In recent years, the use of hotel entertainment systems to provide in-room entertainment and services has become increasingly widespread. Such entertainment systems often include the provision of free television programming and pay-per-view movies. Such systems also often allow the guest to order hotel services such as laundry services and room service, and can provide alternative check-out services. A further potential use for such hotel entertainment systems is the provision of in-room video games.

In-room video games are currently provided through the use of conventional video game generators which are rented from the hotel and connected to the television provided in the room of a guest. This method of providing video games, while currently popular, results in severe wear and tear on the video game generators due to their frequent use and occasional abuse. Further, the renting of a video game generator is inconvenient for a hotel guest who wishes to play for a short period of time but does not wish to make a trek to the front desk of the hotel to rent the game generator.

An alternative method of providing in-room video games is to place a video game generator in each room of the hotel. However, this solution can be expensive and does not solve the problems of theft and wear and tear on the video game generators. Further, a difficulty arises in charging a guest for the use of the video game generator. Either an additional metering device must be installed with the game generator in each room of the hotel or the video games must be offered to the guests free of charge.

It is therefore desirable to find a way in which to enable video games to be played in each room of a hotel which is not prohibitively expensive, minimizes the wear and tear on the equipment used to provide the games and enables a user of the video games to be easily and accurately billed. It would also be desirable for the video games to be able to be provided upon the demand of the user.

SUMMARY OF THE INVENTION

The present invention provides a method for enabling video games to be played in each room of a hotel without having to provide a video game generator in each room. The video games are provided as part of a hotel entertainment system including a head end system where the video game audio and video signals are generated and a plurality of guest terminals, each of which is connected to the head end system by a distribution system.

The head end system portion of the entertainment system includes a video game system having a plurality of video game generators or engines. Each video game engine generates a signal which is processed and transmitted to one of the guest terminals via the distribution system. Each guest terminal is linked to a television on which the video game video signals are provided and to a game controller for user interaction.

A host computer at the head end system portion of the entertainment system interrogates each guest terminal during the normal operation of the entertainment system through a series of system interrogations which are generated by the host computer and provided to the guest terminals via the distribution system. The guest terminals reply to the system interrogations via the distribution system.

To provide the video games, separate game interrogations are generated by the host computer and provided to the guest terminals via the distribution system. The host computer does not generate system interrogations during each of the game interrogations. Each game interrogation includes a series of response positions for the responses of the guest terminals to the game interrogation. Those guest terminals through which a video game is actively being played will respond to each game interrogation and will do so in an assigned one of the response positions.

BRIEF DESCRIPTION OF THE DRAWINGS

FIG. 6 shows the interleaving of a game interrogation into a series of system interrogations.

DETAILED DESCRIPTION OF THE PREFERRED EMBODIMENTS

The present invention enables video games to be played in each guest room of a hotel without the need to install a video game generator in each room. Video and sound signals for such video games are generated by a limited number of video game generators at a central location in the hotel, and are provided on demand to each guest room for a particular game using a signal distribution system which links the video game generators to both a television and a game controller provided in each guest room. The game controller is similar in form and function to a commercially available game controller and is periodically checked by a head end entertainment system controller via the distribution system to determine which keys have been pressed. The results obtained in each check are provided to the video game generators which process the information to provide appropriate signals for play of the game.

Figure 1:
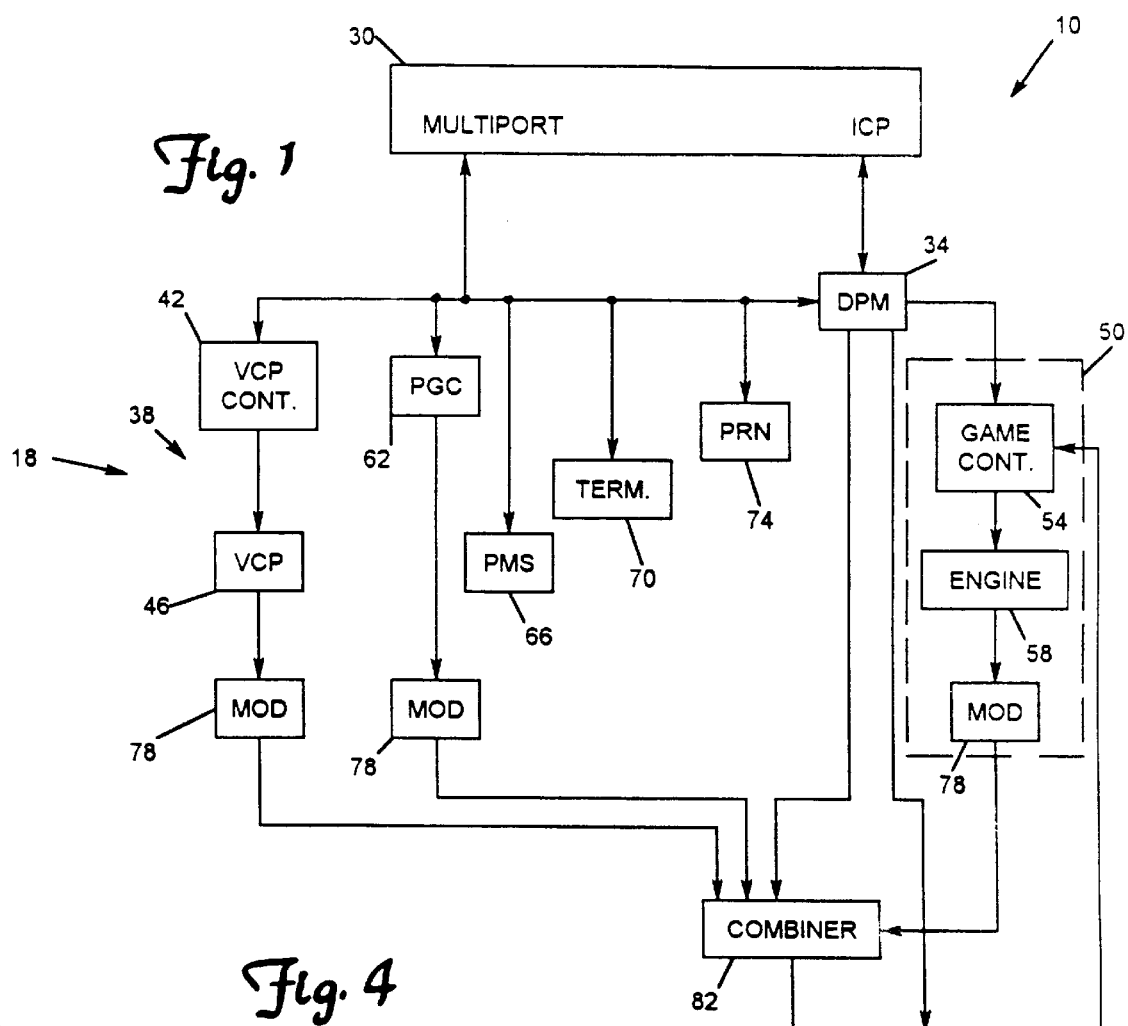
FIG. 1 is a schematic diagram showing a hotel entertainment system having the capability to provide in-room video games.
Figure 4:
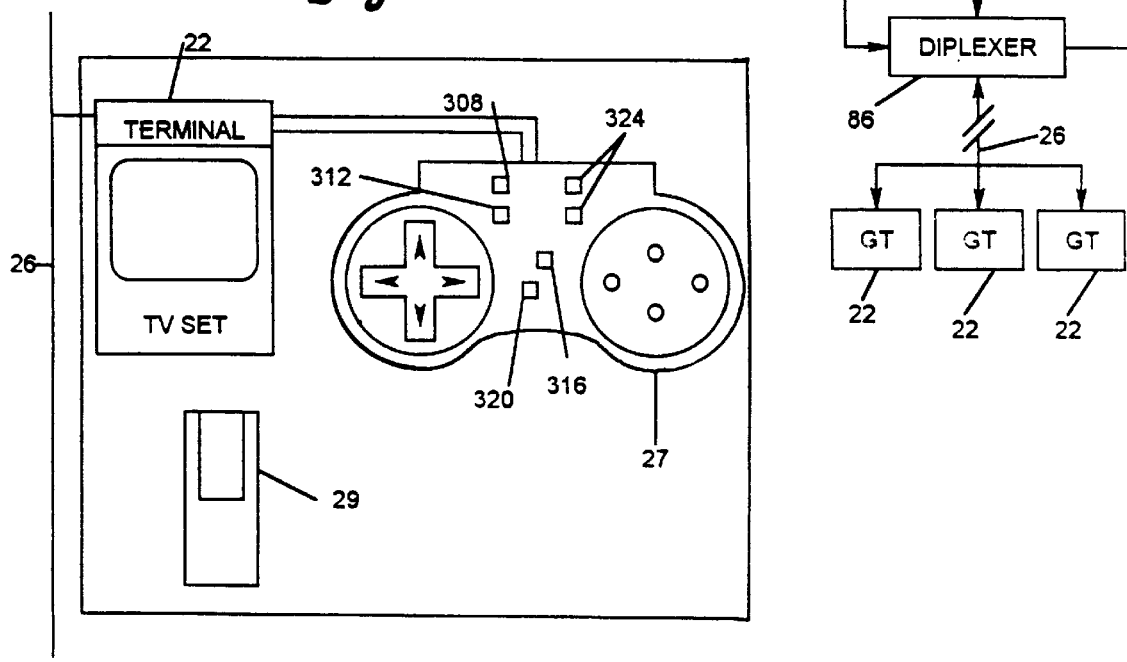
FIG. 4 shows a guest terminal used in the hotel entertainment system.

An entertainment system 10 capable of providing in-room video games, in addition to movies, hotel information and other guest services, is shown in FIG. 1. The entertainment system 10 includes a central system management and signal generation center, or head end system 18, and a plurality of guest terminals 22, each of which is linked to the head end system 18 by a two-way master antenna television (MATV) distribution system 26. Each guest terminal 22 is electrically connected to a guest game controller 27 and a television 28 which can be operated by an infrared remote controller 29, as shown in FIG. 4.

The head end system 18 includes a host computer 30 having system management software therein directing it's performance so as to operate the entertainment system 10. The head end system 18 also includes a dual port modem 34, a video cassette player system 38 including a video controller 42 and an array of video cassette players 46, a video game engine system 50 including a head end game controller 54 and an array of video game generators or engines 58, a peripheral graphics computer 62, a property management system access port 66, a front desk terminal 70 and a printer 74. In addition, the head end system 18 includes a plurality of radio frequency (RF) modulators 78, a combiner 82 and a diplexer 86. While a plurality of video game engines 58 and a plurality of video cassette players 46 are typically used along with corresponding modulators, only one of each and its modulator is shown in FIG. 1 for clarity. Further, while the peripheral graphics computer 62 typically has a plurality of outputs along with corresponding modulators, again only one is shown with its modulator in FIG. 1.

The signals to be distributed to the guest terminals 22 are obtained or generated in the head end system 18 portion of the entertainment system 10 under the control of the host computer 30. Each of the video cassette players 46 and video game engines 58 generates a baseband video signal which is provided to a corresponding one of the RF modulators 78. In addition, the peripheral graphics computer 62 generates a plurality of baseband video signals, each of which is provided to a corresponding one of the RF modulators 78. Each RF modulator 78 frequency translates the received baseband signal using amplitude modulation to one of a plurality of standard television broadcasting frequency ranges or channels, and provides the translated signal to the combiner 82.

The combiner 82 additively combines each of the RF signals into a single complex signal and provides the combined signal to the diplexer 84, which distributes the combined signal to each of the guest terminals 22 via the distribution system 26. The diplexer 84 enables two-way communication between the head end system 18 and the guest terminals 22 by routing the combined signal to the distribution system 26 while routing guest terminal information from the distribution system 26 to various elements of the head end system 18.

The distribution system 26 comprises a coaxial cable network including amplifiers, splitters and taps, and provides two-way communication between the head end system 18 and each of the guest terminals 22. Each guest terminal 22, upon receiving instructions from the host computer 30, is able to be directed to select any of the channels provided in the combined signal, and then provide the signal carried on that channel to its corresponding television 28. The ability of the guest terminals 22 to obtain any one of a number of provided channels allows a variety of entertainment and service options, as well as information and instructions on their use, to be provided to each guest terminal 22 and its corresponding television 28.

The peripheral graphics computer 62 is a microprocessor-based computer which enables communication between the entertainment system 10 and a user by generating and providing, under direction of the host computer 30. instructional and informative text and graphics on the screen of each television 28. In addition, the peripheral graphics computer 62 generates and provides, under direction of the host computer 30, menus listing guest services and entertainment options to each television 28. A user can respond to the instructions or menu choices provided on the television screen through the use of buttons or keys on both the infrared remote controller 29 and the guest game controller 27. The user keystrokes entered in these controllers are obtained by the host computer 30 through a system polling process directed by it.

In this polling process the guest terminals 22 are periodically interrogated by the host computer 30 to provide keystroke information. The guest terminals 22 currently involved in playing video games are also interrogated through a separate game polling process in which game keystroke information is requested. Both the system and game polling processes are provided by the host computer 30 which generates the individual interrogations and provides them to the dual port modem 34 for transmission to the guest terminals 22 via the distribution system 26. The system polling process interrogates one guest terminal 22 at a time while the game polling process interrogates all of the active game-playing guest terminals 22 at once.

The dual port modem 34 transmits each interrogation by having it modulate a 50 MHz RF carrier signal using frequency shift key modulation. The dual port modem 34 then provides the modulated signal to the combiner 82 to be additively combined with the other RF signals provided to the combiner 82. Each interrogation is then provided to the guest terminals 22 via the distribution system 26. Each guest terminal 22 responds to a system or game interrogation by providing keystroke information to the host computer 30 via the distribution system 26 in the form of frequency shift key modulation of a 22 MHz RF carrier signal.

If the keystroke information received in response to a system interrogation indicates that a user wants to receive an interactive menu, movie, or video game, the host computer 30 instructs the guest terminal 22 from which the keystroke information was received to select a particular channel in the combined signal in which a video source is providing the requested signal. Each of the free commercial broadcast television channels, as well as certain unchanging screens provided by the peripheral graphics computer 62, are continually provided to the guest terminals 22 in the combined signal on a particular channel. The users of the guest terminals 22 can select any of these channels without receiving instructions from the host computer 30.

The front desk terminal 70 provides the hotel staff with a link to the entertainment system 10, including access to the host computer 30. The terminals 70 permits a user to monitor the entertainment system 10, provide help to the user of any guest terminal 22 and, together with the printer 74, provide a written record of any entertainment system 10 activity. The property management system access port 66 enables the entertainment system 10 to be linked with a hotel property management system which is used to automatically bill a guest for each movie or video game purchased during their stay, and possibly for room billings or other matters.

Figure 2:
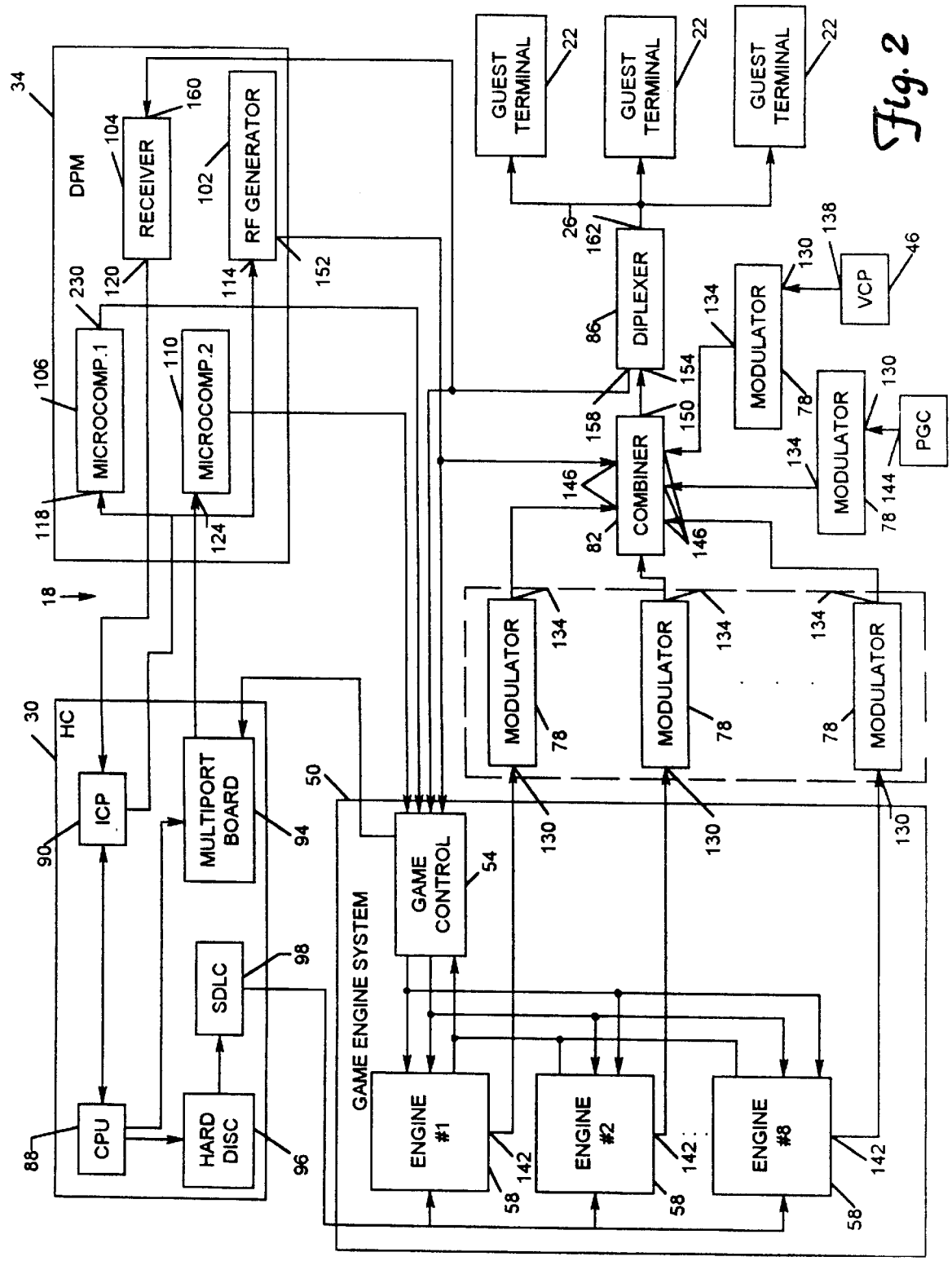
FIG. 2 is a schematic diagram showing a portion of the hotel entertainment system.

The portion of the head end system 18 of the entertainment system 10 used to provide signals for in-room video games is shown in more detail in FIG. 2. The host computer 30 contains a central processing unit 88 which is linked to a communications processor 90, a multiport 94, a hard disc drive 96 and a synchronous data-link controller (SDLC) 98. The central processing unit (CPU) 88 is for instance, a 486DX microprocessor manufactured by Intel® which utilizes a management system including programmable applications software located on the hard disc drive 96 to manage the entertainment system 10 through the communications processor 90 and the multiport 94. The CPU 88 operates under the control of a well known UNIX operating system.

The communications processor 90 is a microprocessor-based universal asynchronous receiver/transmitter (UART) and provides a communications link between the CPU 88 and the guest terminals 22. The communications processor 90 generates, under direction of the CPU 88, both the system interrogations and the game interrogations. The communications processor 90 also receives the guest terminal responses to each interrogation and informs the CPU 88 when there has been a change in status of one of the guest terminals 22. The CPU 88 processes any change in status. The multiport 94 is a data directing device which acts under the direction of the CPU 88 and enables the CPU 88 to communicate with various elements of the head end system 18, including the video game engines 58. The SDLC 98, under the direction of the CPU 88, reformats video game software from the hard disc drive 96 into a format that can be read by the video game engines 58, and then provides the software to the video game system 50 where it is loaded into the appropriate video game engine 58.

The dual port modem 34 provides a communications link between the host computer 30 and the distribution system 26 as well as a communications link between the host computer 30 and the head end game controller 54. The dual port modem 34 contains a radio frequency signal generator 102, a radio frequency signal receiver 104, a first microcomputer 106 and a second microcomputer 110. The radio frequency signal generator 102 modulates a 50 MHz carrier signal based on baseband digital signals received from the communications processor 90 using frequency shift key modulation. The radio frequency signal receiver 104 demodulates a 22 MHz carrier signal received from the diplexer 86 that has been modulated using frequency shift keying modulation based on keystroke information at the guest terminals 22. The first microcomputer 106 performs a timing pulse generation function while the second microcomputer 110 performs a signal separation function. The functions of both the first and second microcomputers 106 and 110, each of which includes a Motorola® 68HC11A0 microprocessor, are described in more detail below.

The communications processor 90 is electrically connected to the dual port modem 34 such that the processor 90 can provide signals both to an input 114 of the signal generator 102 and to an input 118 of the first microcomputer 106, and so it can receive signals from an output 120 of the receiver 104. The multiport 94 is electrically connected to the dual port modem 34 such that the multiport 94 can provide signals to an input 124 of the second microcomputer 110. The multiport 94 can also receive signals from the video game engine system 50.

Each of the RF modulators 78 has an input 130, for receiving the baseband signals generated by its corresponding one of the video cassette players 46, the video game engines 58 and the peripheral graphics computer 62, and an output 134 for providing the translated signals to the combiner 82. Each videocassette player 46 has an output 138 which is electrically connected to the input 130 of its corresponding one of the RF modulators 78. In addition, each video game engine 58 has an output 142 which is electrically connected to the input 130 of its corresponding one of the RF modulators 78. The peripheral graphics computer 62 has a plurality of outputs 144 for providing screen displays, each of which is electrically connected to the input 130 of its corresponding one of the RF modulators 78. Although not shown in the Figures, it is possible for the RF modulators to have more than one input so that they can receive signals from more than one of the video cassette players 46, video game engines 58 and outputs of the peripheral graphics computer 62.

The combiner 82 has a plurality of inputs 146 and an output 150. Each of the RF modulator outputs 134, as well as an output 152 of the RF signal generator 102 in the dual port modem 34, are electrically connected to one of the inputs 146 of the combiner 82. The combiner 82 additively combines each of the RF signals provided at its inputs 146 into a single complex signal and provides the combined signal at its output 150. The diplexer 84 has an input 154 which is electrically connected to the output of the combiner 150, an output 158 which is electrically connected to an input 160 of the radio frequency signal receiver 104 in the dual port modem 34 as well as the head end game controller 54, and a two-way communications port 162 which links the head end system 18 with the MATV distribution system 26. The diplexer 84 receives the combined signal at its input 154 and provides the combined signal to the distribution system 26 via the two-way communications port 162. The diplexer 84 also receives interrogation response signals from the guest terminals 22 at the two-way port 162 and provides those signals to both the radio frequency signal receiver 104 and the head end game controller 54.

Figure 3:
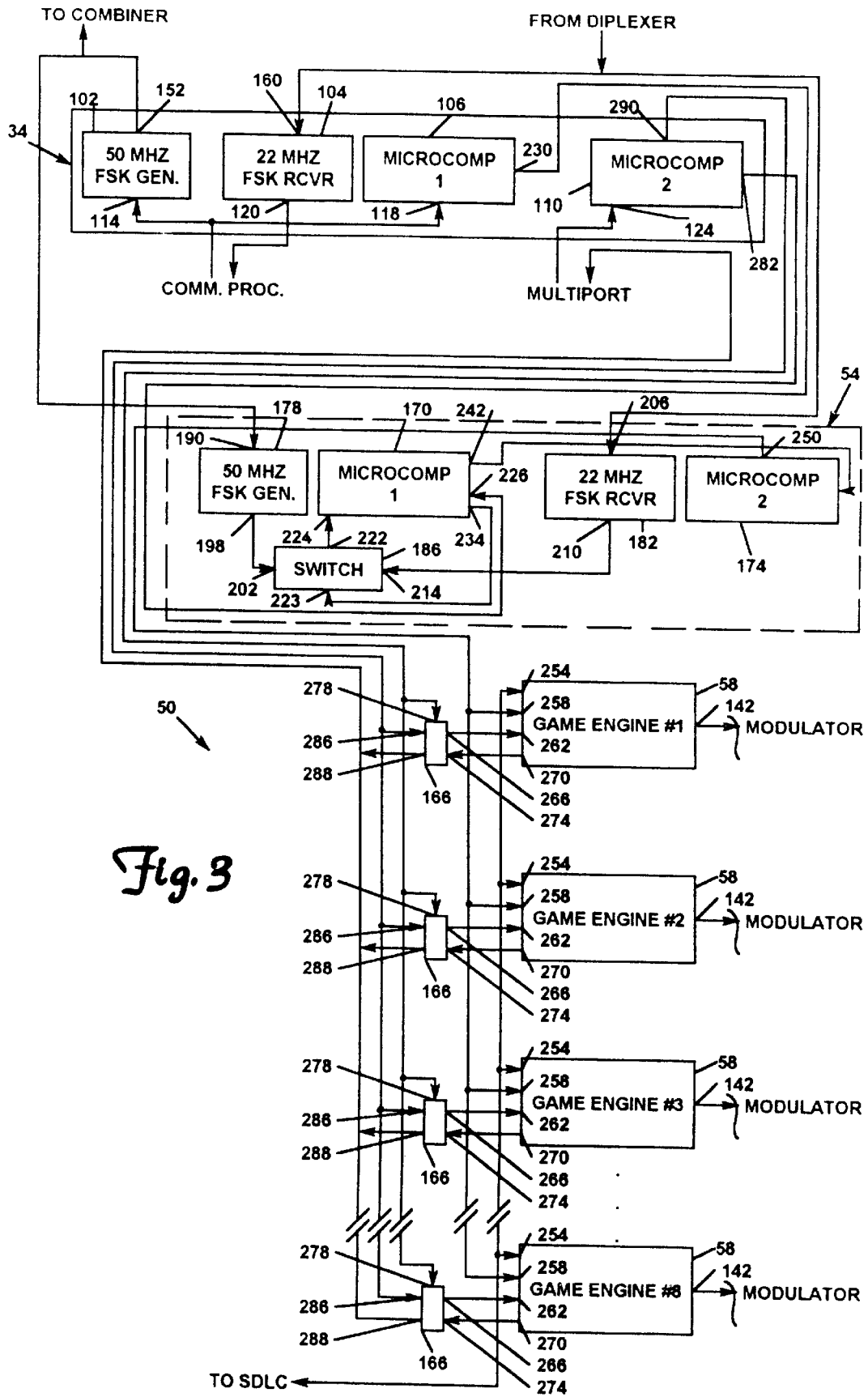
FIG. 3 is a schematic diagram showing the video game engine system.

The video game engine system 50, which includes up to eight video game engines 58, the head end game controller 54 and a plurality of selective transmission switches 166, is shown in more detail in FIG. 3. To better show the connections between the dual port modem 34 and the head end game controller 54, the block diagram of the dual port modem 34 shown in FIG. 2 is repeated in essence in FIG. 3. The head end game controller 54 includes a first microcomputer 170, a second microcomputer 174, a first receiver 178, a second receiver 182 and a selective transmission switch 186.

The first receiver 178 has an input 190 which is electrically connected to the output 152 of the RF generator 102, and an output 198 which is electrically connected to a first input 202 of the selective transmission switch 186. The second receiver 182 has an input 206 which is electrically connected to the output 158 of the diplexer 86, and an output 210 which is electrically connected to a second input 214 of the selective transmission switch 186.

The first receiver 178 demodulates a modulated 50 MHz RF carrier signal which has been modulated using frequency shift keying modulation by the RF generator 102. The second receiver 182 demodulates a modulated 22 MHz RF carrier signal which has been modulated using frequency shift keying modulation by guest terminals 22, and which is obtained from the diplexer 86. The selective transmission switch 186 selectively provides the signals received at its first and second inputs 202 and 214 at an output 222 based upon a signal received at a third input 223.

The first microcomputer 170 in the head end game controller 54 includes a Motorola® 68HC11A0 microprocessor, has a first input 224 which is electrically connected to the output 222 of the selective transmission switch 186, and a second input 226 which is electrically connected to an output 230 of the first microcomputer 106 in the dual port modem 34. In addition, the first microcomputer 170 in the head end game controller 54 has a first output 234 which is electrically connected to the third input 223 of the selective transmission switch 186, and a second output 242 which is electrically connected to an input 246 of the second microcomputer 174 in the head end game controller 54. The second microcomputer 174 in the head end game controller 54 includes a Motorola® 68HC11A0 microprocessor and has an output 250 which is electrically connected to each of the video game engines 58. The first microcomputer 170 in the head end game controller 54 performs both an interrogation monitoring function and a game interrogation response forwarding and error detection function. The second microcomputer 174 in the head end game controller 54 performs a game engine notification function and a game interrogation response transmission rate conversion function.

Each video game engine 58 has a first input 254 which is electrically connected to the SDLC 98, a second input 258 which is electrically connected to the output 250 of the second microcomputer 174 in the head end game controller 54, and a third input 262 which is electrically connected to a first output 266 of a corresponding one of the selective transmission switches 166. Each video game engine 58 has two outputs, the first output 142 which is electrically connected to the input 130 of a corresponding one of the RF modulators 78, and a second output 270 which is electrically connected to a first input 274 of a corresponding one of the selective transmission switches 166. Each of the selective transmission switches 166 has a second input 278 which is electrically connected to a first output 282 of the second microcomputer 110 in the dual port modem 34, and a third input 286 which is electrically connected to a second output 290 of the second microcomputer 110 in the dual port modem 34. Each selective transmission switch 166 selectively provides the signal received at its third input 286 to its first output 266 based on the signal received at its second input 278.

Various commands can be sent to the video game engines 58 from the CPU 88 via the multiport 94 and the second microcomputer 110 in the dual port modem 34. The commands include both a one byte address of the engine 58 to which a command is to be sent and the particular command to be given. Because the game engines 58 are not designed to read such an address byte, the selective transmission switches 166 are used to control which game engine 58 receives each command. The second microcomputer 110 in the dual port modem 34 receives each command from the multiport 94 and separates the address byte from the rest of the command. The second microcomputer 110 in the dual port modem 34 then provides the address information to the second input 278 of each selective transmission switch 166 and provides the remainder of the command to the third input 286 of each selective transmission switch 166.

The selective transmission switches 166 are open, or block data transmission, in the normal logic state provided by the second microcomputer 110 to its input 278, thereby preventing commands received at the third input 286 thereof from passing through the second output 266 thereof to the third input 262 of the corresponding game engine 58. If the address information received at the second input 278 of a selective transmission switch 166 corresponds to the address of the game engine 58 to which the selective transmission switch 166 is linked, the selective transmission switches 166 will close to permit data transmission, thus enabling the command received at the third input 286 of the selective transmission switch 166 to be provided to the third output 266 of that switch and so to the third input 262 of that game engine 58. When the game engine 58 receives a command at its third input 262, an acknowledgment is provided from its second output 270 to the CPU 88 through the selective transmission switch 166, which provides signals received at its first input 274 at a second output 288 when the switch 166 is closed, and through the multiport 94.

The first input 254 of any game engine 58, selected by the host computer 30 to provide game signals in response to a guest request at a guest terminal 22, receives the video game software so selected through it being downloaded thereto from the hard disc drive 96 of the host computer 30 through the SDLC 98. After the game code has been so downloaded to the selected game engine 58, a check sum is transmitted to that engine from the CPU 88 through the multiport 94 and the second microcomputer 110 in the dual port modem 34. This selected game engine 58 also computes a check sum on the game code received and provides a signal to the CPU 88 from its second output 270 indicating whether or not the check sum on the received code matches the check sum transmitted from the host computer 30. If the check sums match, then the engine 58 is ready for the game to begin. If the check sums do not match, then the game code is resent by the host computer 30 to the selected game engine 58.

The CPU 88 provides a response selection signal to the selected video game engine 58 into which the game code was downloaded, through the multiport 94 and the second microcomputer 110 in the dual port modem 34, at the time that the game code is downloaded into the game engine 58. The provided response selection signal contains a response position assignment telling this game engine 58 where in the string of guest terminal responses to a game interrogation to find the keystroke information from the corresponding guest terminal 22 that is to be processed by that engine 58. The communications processor 90, under the direction of the CPU 88, provides the guest terminal 22 from which the video game was ordered the same position in the string of guest terminal responses to a game interrogation as the response position assignment of the selected game engine 58.

Once the software for a video game is downloaded, the game engine 58 acts essentially as an ordinary, commercially available video game generator that processes received keystroke information and generates the video game audio and video signals. The second input 258 of each game engine 58 receives keystroke information from the guest terminals 22 as described below. The first output 142 of each game engine 58 provides the generated audio and video signals to a corresponding RF modulator 78 for translation to an RF signal in the frequency channel to which host computer 30 directed the requesting guest terminal 22 to be tuned, and these signals are distributed via the distribution system 26 to that guest terminal 22.

The input 190 of the first receiver 178 receives frequency shift key modulated RF signals provided by the signal generator 102, demodulates those signals, and provides the information contained in the signals at its output 198. The information, which represents the system and game interrogations generated by the communications processor 90, is then routed through the selective transmission switch 186 to the first input 224 of the first microcomputer 170 in the head end game controller 54, which uses an 8.00 MHz crystal to set the cycle of its clocking signal time base, and includes the Motorola® microprocessor and an on-board UART. Thus, the first microcomputer 170 in the head end game controller 54 receives each system and game interrogation. The microcomputer 170 monitors a particular character in each interrogation to distinguish between system and game interrogations. If the interrogation received is a system interrogation, the first microcomputer 170 in the head end game controller 54 operates the selective transmission switch 186 through the third input 223 of that switch so that the signal received at the first input 224 of the first microcomputer 170 remains the signal received at the first input 202 of the switch 186. If the interrogation received is a game interrogation, the first microcomputer 170 in the head end game controller 54 operates the selective transmission switch 186 through the third input 223 of that switch so that the signal received at the second input 214 of the selective transmission switch 186 is provided to the first input 224 of the first microcomputer 170 for the duration of the game interrogation.

The input 206 of the second receiver 182 receives frequency shift key modulated 22 MHz signals provided by the guest terminals 22 through the distribution system 26 and the diplexer 86, demodulates the signals, and provides the information contained in the signals at its output 210. The signals represent keystroke information transmitted from the guest terminals 22 in response to an interrogation. The keystroke information is then provided to the second input of the selective transmission switch 186 at a rate of 62.5 kilobytes per second.

The keystroke information received at the first input 224 of the first microcomputer 170 in the head end game controller 54 is provided at the second output 242 of the first microcomputer 170. The information is then received at the input 246 of the second microcomputer 174 in the head end game controller 54, which uses a 6.71 MHz crystal to set the cycle for its clocking signal time base, and includes the Motorola® microprocessor and an on-board UART. Each byte of the keystroke information is temporarily stored in a buffer of the microprocessor. The second microcomputer 174 then retrieves the keystroke information from this buffer and transmits each byte of information at a rate of 104.2 kilobytes per second from its output 250 for distribution to the second input 258 of each game engine 58. This is made possible through the use of the 6.71 MHz crystal. Thus, the keystroke information provided to the game engines 58, which represents the responses from the guest terminals 22 to a game interrogation, is routed from the distribution system 26 to the appropriate game engines 58 without being passed through the host computer 30. This allows the keystroke information to be processed more quickly. The conversion of the transmission rate to a rate of 104.2 kilobytes per second is necessary for the information to be compatible with the commercially available game engines 58 currently used in the entertainment system 10.

When the first microcomputer 170 in the head end game controller 54 first detects that a game interrogation has been sent to the guest terminals 22 as indicated above, it notifies the second microcomputer 174 in the head end game controller 54 which then provides a two byte notification signal to each of the game engines 58, informing them that a string of responses to a game interrogation is about to be provided. Each currently active game engine 58 then counts the number of bytes of information received from the output 250 of the second microcomputer 174 in the head end game controller 54 to keep track of the response string positions, each of which contains two bytes of information. This counting enables each currently active game engine 58 to determine when the keystroke information in the string response position matching its assigned response position is present. Each game engine 58 processes the keystroke information contained in the string response position matching its assigned response position only.

To avoid counting errors by the game engines 58, two bytes must be provided to the second input 258 of the game engines 58 for each string response position, even if an error occurs in which the data placed in a string response position is invalid. The first microcomputer 106 in the dual port modem 34 monitors the signals provided by the communications processor 90, including the game interrogations. During each game interrogation, the first microcomputer 106 in the dual port modem 34 generates a plurality of timing pulses, each of which corresponds with the beginning of a string response position. These timing pulses are provided to the second input 226 of the first microcomputer 170 in the head end game controller 54, and define the string response positions in which the keystroke information or responses of the guest terminals 22 to a game interrogation are located.

Note that the first microcomputer 170 in the head end game controller 54 normally passes the demodulated signals containing keystroke information from the guest terminals 22 to the second microcomputer 174 in the head end game controller 54 as soon as the signals are received. However, if one of the timing pulses just described is provided from the first microcomputer 106 in the dual port modem 34 before two bytes of valid keystroke information are received from the second receiver 182, indicating an error, the first microcomputer 170 in the head end game controller 54 will discard the response, if any, received for that response position and will instead provide two null characters to the second microcomputer 174 in the head end game controller 54. The null characters are then provided to the second input 258 of the video game engines 58, allowing the game engines 58 to maintain a correct count of the response positions. When a game engine 58 receives null characters in its assigned response position, the game engine 58 will process the null characters according to a game engine error handling routine.

Each guest terminal 22 includes a UART and is electrically connected to the television 28 and the guest game controller 27, as shown in FIG. 4. The guest terminal 22 can be located in a separate box located on or near the television 28 or can be integrated within the television 28. The guest terminal 22 receives system interrogations, game interrogations and other information from the head end system 18 via the distribution system 26. In addition, the guest terminals 22 send responses to game and system interrogations to the head end system 18 via the distribution system 26. At the time of its installation into the entertainment system 10, each guest terminal 22 is assigned a unique identifier or index so that it can be distinguished from the other guest terminals 22. The guest game controller 27 is connected to the guest terminal 22 by a modular connector having a configuration different from that of standard game controllers in an effort to deter theft of the guest game controller 27 by users.

The guest game controller 27 is similar in function to any of a variety of standard commercially available game controllers. The guest game controller 27 includes, in addition to the buttons of a standard game controller, a reset/order button 308, a menu button 312, a start/* button 316, a select button 320 and two volume buttons 324. These additional buttons allow the user to begin a video game, control audio functions, buy additional game time and exit to other services that are offered by the entertainment system 10. Once a video game has begun, the guest game controller 27 functions in the same manner as a standard game controller, with the exception of the buttons 308, 312, 316, 320 and 324, the functions of which are described below. Pushing any of the buttons of the guest game controller 27 generates a keystroke sensed by the guest terminal 22.

The reset/order button 308 is used to purchase services from an interactive menu on the television 28 when the guest terminal 22 is not in the game-playing mode. The reset/order button 308 is used to reset the game being played when the guest terminal 22 is in the game-playing mode. The start/* button 316 is used to jump to the previous channel which was selected when the user is viewing free television channels, and is used to begin a video game after the game code for that game has been loaded into a game engine 58 when in the game-playing mode. The select button 320 is used to make selections from an interactive menu. The volume buttons 324 are used to control the volume level of the television 28 at any time. The menu button 312 is used to access the interactive menu of the entertainment system 10 when the guest terminal 22 is both in and out of the game-playing mode.

Figure 5A:
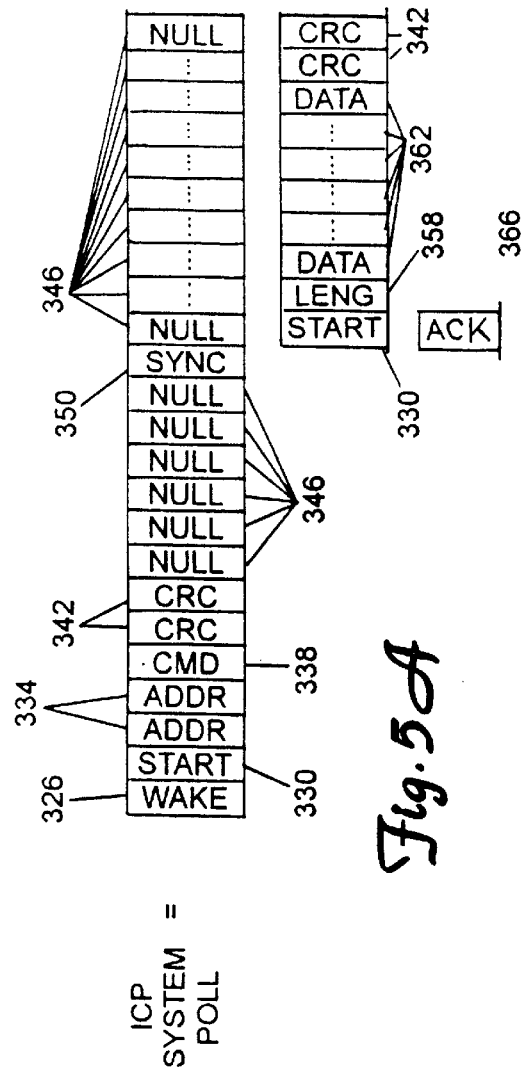
FIG. 5A shows a system interrogation poll and two alternative system interrogation responses.

The communications processor 90, under the direction of the CPU 88, interrogates each guest terminal 22 during the normal operation of the entertainment system 10 through transmitting over the distribution system 26 a series of system interrogations which are generated by the communications processor 90 to include information and instructions provided by the CPU 88. The system interrogations are each formed by sequences or packets of binary data provided to the guest terminals 22 by the radio frequency signal generator 102 using a frequency shift key modulated 50 MHz carrier signal that is distributed through the distribution system 26. A diagram of such a system interrogation represented as a system interrogation data packet is shown in FIG. 5A where the data packet comprises a series of subpackets of one byte of data plus two guard bytes to each represent a defined character. The communications processor 90 interrogates the guest terminals 22 at the rate of approximately 240 interrogations per second, and typically interrogates each guest terminal 22 in a predetermined order or sequence. The predetermined sequence can be altered to provide more frequent system interrogations of guest terminals 22 currently exhibiting greater activity.

Each system interrogation begins with the communications processor 90 providing a UART "wake-up" character 326 which places the UART in each guest terminal 22 in a state of readiness to receive further characters. The system interrogation continues with the communications processor 90 providing a start transmission character 330 followed by two index characters 334 containing the identifier of the guest terminal 22 to be interrogated as designated by the CPU 88. Each guest terminal 22 in the entertainment system 10 receives and processes this portion of the system interrogation to determine whether it is the intended recipient. After the transmission of the index characters 334, only the guest terminal 22 having the identifier represented by the transmitted index characters 334 will continue to process the remainder of the current system interrogation. All other guest terminals 22 will not further process any interrogation until another UART "wake-up" character 326 is sent.

The system interrogation continues with the communications processor 90 providing a command character 338 followed by two cyclical redundancy check characters 342 used for error detection in the transmitted interrogation. If an error is detected by the guest terminal 22, it will not respond to the interrogation and do nothing further until receiving the next interrogation thereto. The command character 338 generally contains information and instructions from the CPU 88, such as a response position assignment for a game interrogation. The guest terminal 22 being interrogated processes the transmitted information during which time the communications processor 90 keeps the transmission therebetween active by providing six null characters 346. The communications processor 90 then initiates a response from the guest terminal 22 by providing at least one synchronization character 350 followed by a plurality of further null characters 346. The guest terminal 22 responds to the system interrogation while these latter null characters 346 are being provided.

Two alternative guest terminal responses to a system interrogation, showing response data packets, are also shown in FIG. 5A, and each comprises subpackets of the same format as in the interrogation packet. All responses to the head end system 18 portion of the entertainment system 10 by a responding guest terminal UART are provided by using a frequency shift key modulated 22 MHz carrier signal transmitted via the distribution system 26. If the current keystroke information requested by the communications processor 90 has changed from the keystroke information current at the time of the previous system interrogation of the guest terminal 22, the guest terminal 22 will respond with the first response alternative having a start transmission character 330 followed by a length character 358 indicating the length of the response that will be sent. This is followed by a number of interrogation response characters 362 containing the keystroke information and two cyclical redundancy check characters 342 which provide error detection as described above. If alternatively, there has been no change in the keystroke information since the previous system interrogation of the guest terminal 22, the guest terminal 22 will respond with the second response alternative which is a single acknowledgement character 366. After the response to the system interrogation is completed, the communications processor 90 will transmit a subsequent interrogation packet to interrogate the next guest terminal 22 in the interrogation sequence.

To provide video games within the entertainment system 10, it is necessary to periodically transmit separate game interrogations to the guest terminals 22 in those rooms in which a video game is to be played. In the present invention, this is accomplished by interleaving the game interrogations into the series of system interrogations. To do this, the communications processor 90 causes a stoppage of the series of system interrogations every ¹⁄₆₀ of a second, at which time the processor 90 completes any system interrogation to a particular guest terminal 22 that may be in progress. Once the response to such a system interrogation in progress is completed, a game interrogation is generated by the communications processor 90 and provided to the guest terminals 22 in the same manner as described for the system interrogations. The game interrogation requests all active game-playing guest terminals 22 to provide to the head end system 18 any keystroke information that has been entered into the guest game controller 27 since the last game interrogation. During a game interrogation, the generation of system interrogations by the communications processor 90 is suspended.

Figure 5B:
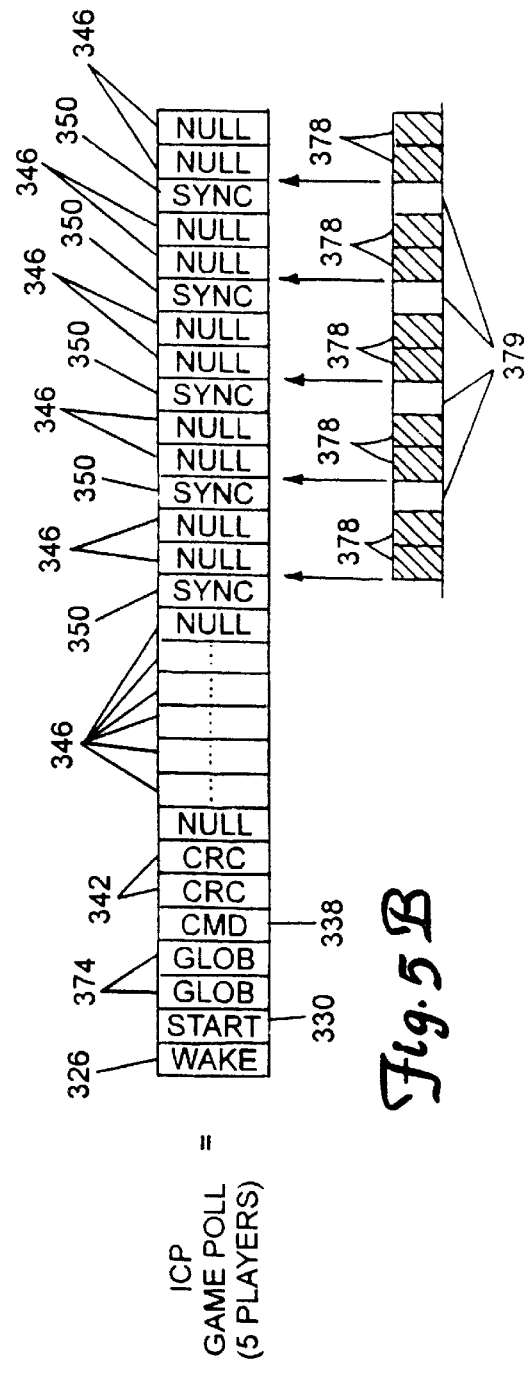
FIG. 5B shows in a game interrogation and a game interrogation response.

A diagram of a game interrogation is shown in FIG. 5B which shows a game interrogation data packet. The game interrogation begins in the same manner as a system interrogation, with the communications processor 90 providing a UART "wake-up" character 326 to place the UART in each guest terminal 22 in a state of readiness to receive further characters. The communications processor 90 then provides a start transmission character 330, followed by two global index characters 374 which, unlike the index characters 334 described above, causes a portion of the guest terminals 22, on which a video game is currently being played to be ready to receive and process further information. The game interrogation continues with the communications processor 90 providing a command character 338 from the CPU 88 followed by two cyclical redundancy check characters 342, each of which has the same function as those in the system interrogation. Each of the guest terminals 22 which are in an active game-playing mode then processes the transmitted information and obtains keystroke information from the guest game controller 27, during which time the communications processor 90 keeps the transmission therebetween active by providing seven null characters 346. The communications processor 90 then provides a single synchronization character 350. This begins a response period in which each of the guest terminals 22 in the game-playing mode will respond to the game interrogation.

Each of the guest terminals 22 in the game-playing mode are addressed by the interrogation data packet simultaneously in each game interrogation. To prevent collisions of guest terminal responses to the game interrogation, each guest terminal 22 is assigned a string response position as described above for responding to a game interrogation. This assignment takes place at the time that the user of the guest terminal 22 requests a video game. Generally, the string response position assigned to a guest terminal 22 is the lowest available position between one and sixteen, the maximum number of responses that are accommodated in a single game interrogation. Although it is possible to accommodate further responses to a game interrogation, it would result in the frequency of system interrogating falling below the desired standard so that users of the entertainment system 10 might begin to notice response delays on the television 28 connected to the guest terminal 22 being used. The guest terminal 22 that is assigned the first response position will transmit its response to a game interrogation immediately after receiving the synchronization character 350, while guest terminals 22 assigned subsequent response positions will delay prior to transmitting their response.

The synchronization character 350 is followed by two null characters 346. The null characters 346 are followed by a second synchronization character 350 and two more null characters 346. This pattern is repeated so that, during the response period, the communications processor 90 provides a synchronization character 350 every third byte. During the provision of the two null characters 346 following each synchronization character 350, one of the guest terminals 22 will respond to the game interrogation. Therefore, each pair of null characters corresponds to one of the string response positions in the game interrogation response. Each of the guest terminals 22 in the game-playing mode receives the synchronization characters 350 and counts them to determine when their string response position occurs. The responses of five guest terminals 22 to a game interrogation is shown in FIG. 5B, which shows a game response data packet below, but in correspondence with the game interrogation packet. Each guest terminal 22 provides two response characters 378, the response characters containing keystroke information from the guest game controller 27 to which it is linked. Between each pair of response characters 378 is a guard character 379 which provides protection against collisions between successive responses.

Each character provided in the system and game interrogations, as well as the responses to the interrogations, is designated by eight information bits, one start bit and one stop bit, for a total of 10 bits. Guest terminals 22 and RF signal generator 102 each have a data transmission rate of 62.5 kilobits per second so that each bit takes 16 microseconds for transmission to result in each character having a transmission time of 160 microseconds. During a game interrogation, there is therefore a 480 microsecond time delay between the beginnings of successive guest terminal responses, including a 320 microsecond period in which two response characters 378 are transmitted from a guest terminal 22 to the head end system 18 and a 160 microsecond guard period.

The interleaving of a game interrogation into a sequence of system interrogations is shown in FIG. 6. An internal timer instructs the communications processor 90 to stop generating system interrogation data packets 380 at time $t_0$, at which time any system interrogation in progress is allowed to be completed. After a system response data packet 382 is provided to the head end system 18, a game interrogation data packet 386 having an interrogation duration 390 and a responses duration 394 is provided to the guest terminals 22. The responses duration 394 can be up to 48 characters long, a length sufficient to allow two character responses separated by guard bits from up to 16 guest terminals 22. After the last guest terminal response, the communications processor 90 resumes generating system interrogation data packets 380. The sequence of system interrogations and responses continues until the next instruction to stop generating system interrogations, which occurs 1/60 of a second after the time $t_0$ of the previous instruction.

Upon completion of each game interrogation, the communications processor 90 resumes generating system interrogations, beginning with the next guest terminal 22 in the system interrogation sequence after that one interrogated last prior to the start of the game interrogation. Those guest terminals 22 which are in an active game-playing mode remain in the sequence of system interrogations. Each game interrogation can interrogate up to 16 guest terminals 22 without significantly decreasing the amount of time between system interrogations of each guest terminal 22. Thus, the polling system of the present invention allows up to 16 game engines 58 to be used concurrently on a single MATV distribution system 26.

Minimizing the amount of time that it takes to complete each game interrogation so that there is additional time for system interrogations is desirable as the responsiveness of the entertainment system 10 can be increased by more frequently interrogating each guest terminal 22. When a guest terminal 22 is taken out of the game-playing mode so that its previously assigned response position is no longer used, the game interrogation response period becomes longer than necessary. If one of the guest terminals 22 remaining in the game-playing mode has a later string response position than the newly unused response position, both that guest terminal 22 and the corresponding game engine 58 are reassigned to the unused position. This helps to minimize the number of response positions provided in the game interrogation for guest terminal responses, thereby minimizing the amount of time necessary to complete the game interrogation.

To effect reassignment, the guest terminal 22 to be reassigned is first assigned to the now unused or new, string response position while still remaining assigned to its previous, or old, string response position. This is done during the next system interrogation of the guest terminal 22, when the communications processor 90, under direction of the CPU 88, provides both string response positions to the guest terminal 22 whose position is to be changed in the command character 338. The guest terminal 22 will then respond to each game interrogation in both the new and old response positions, with the corresponding game engine 58 processing only the keystroke information received in the old response position. The multiport 94, under direction of the CPU 88, will then send a signal to the video game engine 58 having the old response position assignment giving it the new response position assignment.

Once that game engine 58 acknowledges to the multiport 94 that it has received the new response position assignment, the communications processor 90, under direction of the CPU 88, instructs the guest terminal 22 in the command character 338 of the next system interrogation to respond to game interrogations in only the new string response position. Both the guest terminal 22 and the game engine 58 that were assigned to the old response position now respond to game interrogations and receive keystroke information, respectively, so that the new string response position of the terminal 22 corresponds to the new response position assignment of the engine.

Once the reassignment of the guest terminal 22 and game engine 58 to a new response position is completed, the communications processor 90, under direction of the CPU 88, decreases the number of synchronization characters 350 sent in each game interrogation to correspond to the reduced number of guest terminals 22 in the game-playing mode. The process of temporarily assigning a guest terminal 22 to two string response positions allows the game engine 58 to be given a new response position assignment without the risk of a game interrogation response not being received by the game engine 58. Without this process, difficult timing problems would have to be overcome to reassign a guest terminal 22 to a new string response position while simultaneously giving its game engine 58 a new response position assignment without that engine missing any game interrogation responses.

Figure 7:
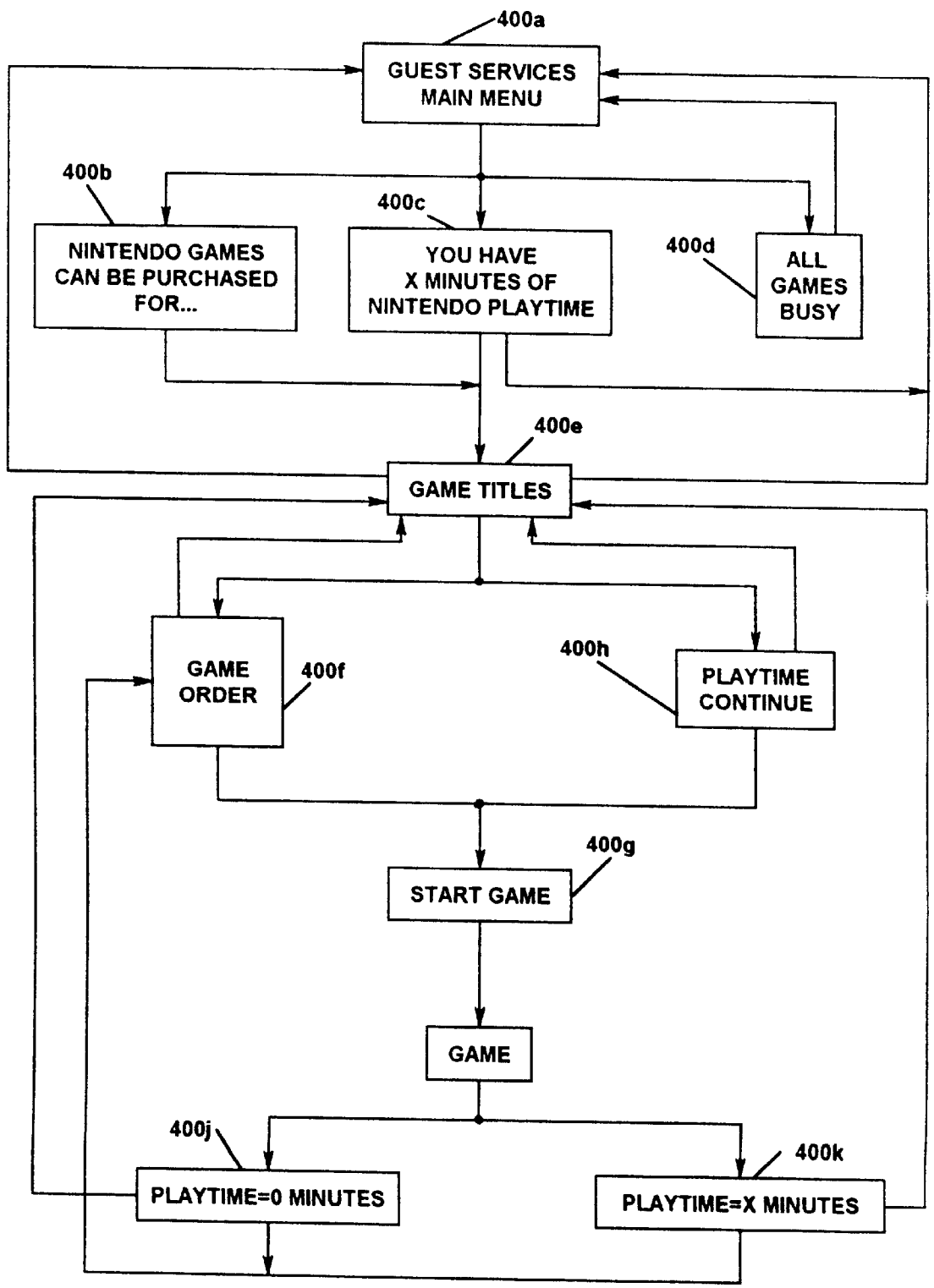
FIG. 7 is a flow chart showing the process by which a user selects a video game from the hotel entertainment system.

A flow diagram showing the process by which a user selects a video game is shown in FIG. 7. To begin the game selection process, a user presses the menu button 312 on the guest game controller 27 shown in FIG. 4. The guest terminal 22 informs the CPU 88 that the menu button 312 has been pressed in its response to the next system interrogation. In the subsequent system interrogation, the communications processor 90, under direction of the CPU 88, directs the guest terminal 22 to select a channel containing one of the signals generated by the peripheral graphics computer 62. When the guest terminal selects the assigned channel, a guest services menu 400*a*, shown in FIG. 7, will appear on the television 28.

The guest services menu 400*a*, as well as other menus and information screens provided to the television 28 during the game selection process, is provided by the peripheral graphics computer 62 on the assigned channel under the direction of the CPU 88. Each button depression by the user during the game selection process will be provided to the CPU 88 in the same manner as that described for the menu button 312.

The user next selects the form of entertainment or service desired by moving a highlight bar along a list of entertainment and service options and pressing the select button 320 when the desired option is highlighted. If the user selects in-room video games, one of three screens will appear on the television 28. If the user has selected video games for the first time during his stay, a screen 400*b* will appear that gives the user specific information regarding the purchase of video games. If the user has previously purchased time remaining from a prior game-playing session, a screen 400*c* will appear informing the user of the amount of time remaining from the prior session. If all of the video game engines 58 are currently in use, a screen 400*d* will appear informing the user that all games are currently busy. Regardless of which of these three screens appears, the user will be given the option of returning to the guest services menu 400*a* by pressing the start button 316.

If either screens 400*b* or 400*c* appear, the user can, by pressing the select button 320, call up a screen 400*e* which shows a list of the video game titles available. The user can then select the video game he wishes to play by moving a highlight bar to the desired game title and pressing the select button 320. Once the select button 320 is pressed, one of two screens will appear on the television 28. If the user is making his first purchase of a video game, a screen 400*f* will appear, giving the user further information on how to order playing time. The user can then order playing time by pressing the order button 308, at which time a start screen 400*g* will appear to instruct the user that the video game can be started by pressing the start button 316. If the user has time remaining from a previous session, a screen 400*h* will appear to instruct the user to press the select button 320 to get to the start screen 400*g*. The user can return to the game title screen 400*e* from both screens 400*f* and 400*h* by pressing the start button 316.

The start screen 400*g* informs the user how to exit from or suspend the video game during play and how to buy additional game time or use other guest services. From the start screen 400*g*, the user can begin the selected video game by pressing the start button 316. If this occurs, the game code for the selected video game is downloaded from the hard disc drive 96 to one of the game engines 58 via the SDLC 98. In the subsequent system interrogation, the communications processor 90, under direction of the CPU 88, directs the guest terminal 22 to select a channel containing the signal generated by the video game engine 58 to which the game code for the selected game was downloaded. When the guest terminal selects the newly assigned channel, the video game audio and video signals will be shown on the screen of the television 28.

When the video game is started, both the guest terminal 22 in the room of the user and the game engine 58 to which the game code was downloaded are assigned a response position for providing and receiving, respectively, keystroke information in response to game interrogations. The guest terminal 22 in the room of the user will now respond to each game interrogation by providing to the head end system 18 any keystroke information from the guest game controller 27 operated by the user. The keystroke information is provided to and processed by the game engine system 50 without being sent to the CPU 88. The video signal provided to the screen of the television 28 is provided by the assigned game engine 58 throughout the duration of the video game.

Using the guest game controller 27, game play will continue until the purchased time has expired or the user interrupts play by pressing the menu button 312. Should the purchased time expire, a screen 400*j* will appear instructing the user that no play time remains. The screen 400*j* will also give the user options for purchasing further play time, changing the selected video game or accessing other guest services. Should the user interrupt the selected game during play, a screen 400k will appear giving the user the same options as those given on screen 400*j*, with the additional option of returning to the game in progress. In both cases, the communications processor 90, under direction of the CPU 88, directs the guest terminal 22 to select a channel containing one of the signals generated by the peripheral graphics computer 62 to enable the screens 400*j* and 400k to be provided.

Although not shown, a second game engine system can be provided in the head end system 18 of the entertainment system 10. The second game engine system would be identical to the first game engine system 50 and would be electrically connected to the host computer 30, dual port modem 34 and MATV distribution system 26 in the same way as that described for the first game engine system 50. The second game engine system is an extension of the first game engine system 50 and does not generate any signals that conflict with those generated by the first game engine system 50.

If a second game engine system is used, an additional eight RF modulators 78 would be required, one for each of the game engines 58 in the second game engine system. The additional RF modulators 78 would be incorporated into the head end system 18 in the same manner as that described for the RF modulators 78 which are electrically connected to the game engines 58 in the first game engine system 50. By providing a second game engine system, each of the 16 response positions for response to each game interrogation can be utilized.

Figure 8:
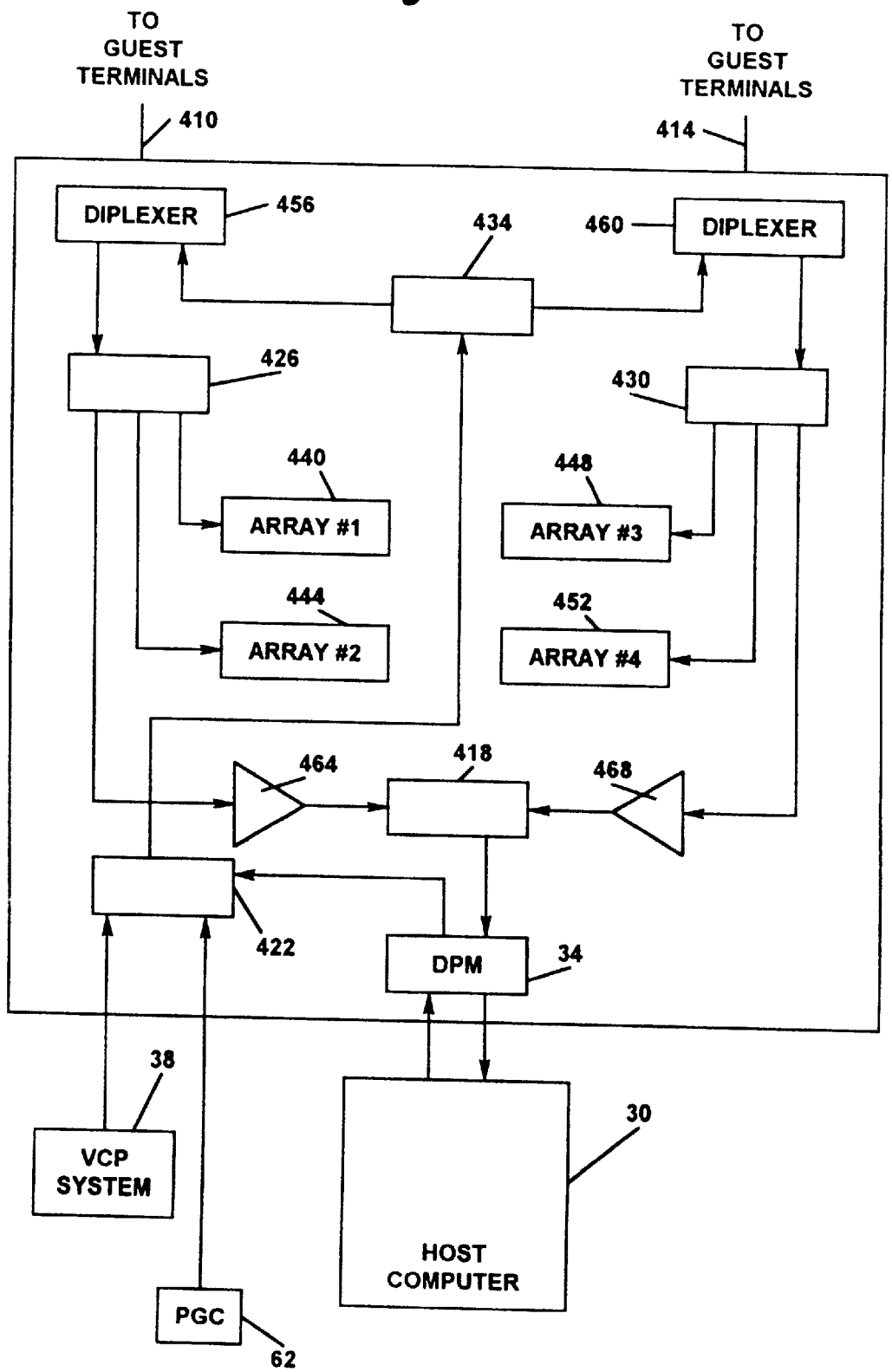
FIG. 8 is a schematic diagram showing the use of multiple branches to distribute video game signals.

A first alternative embodiment of the present invention provides for the use of more than 16 video game engines 58 in the entertainment system 10 and is shown FIG. 8. Such an embodiment would be used where the size of the hotel is such that sixteen game engines 58 is not sufficient to satisfy the demand for in-room video games.

In the first alternative embodiment, the MATV distribution system 26 has both a first branch 410 and a second branch 414, each of which links a corresponding separate plurality of guest terminals 22 to the head end system 18 portion of the entertainment system 10. The head end system 18 includes the host computer 30, the dual port modem 34, the video cassette player system 38 and the peripheral graphics computer 62 as described in the first embodiment. In addition, the head end system 18 includes first and second combiners 418 and 422, first, second and third routers 426, 430 and 434, first, second, third and fourth game engine systems 440, 444, 448 and 452 and first and second diplexers 456 and 460. The head end system 18 further includes first and second isolation amplifiers 464 and 468.

Both the first and second branches 410 and 414 of the distribution system 26 distribute, through first and second diplexers 472 and 476 respectively, the same signals from the video cassette player system 38 and the peripheral graphics computer 62. In addition, both system interrogations and game interrogations, which are generated from the host computer 30, are distributed on both the first and second branches 410 and 414. However, signals from the game engine systems are divided between the branches as the signals from the first and second systems 440 and 444 are provided to the first branch 410 while the signals from the third and fourth systems 448 and 452 are provided to the second branch 414.

Return signals from the guest terminals 22 on the first branch 410 are sent through the first diplexer 472 to the first router 426 before being routed to the first and second game engine systems 440 and 444. Return signals from guest terminals 22 on the second branch 414 are provided through the second diplexer 476 to the second router 430 before being routed to the third and fourth game engine systems 448 and 452. Thus, each branch of the distribution system 26 runs a separate group of sixteen video game engines 58.

The first router 426 provides the return signal from the first branch 410 to both the first and second game engine systems 440 and 444. The router 426 also sends the return signal to the first combiner 418 through the first isolation amplifier 464. The second router 430 provides the return signal from the second branch 414 to both the third and fourth game engine systems 448 and 452. The second router 430 also sends the return signal to the first combiner 418 through the second isolation amplifier 468.

The isolation amplifiers 464 and 468 boost the signal level to compensate for any losses and also provide isolation to prevent signals from one branch from leaking through the first combiner 418 and reaching the systems in the other branch. The return signal that is provided to the dual port modem 34 from the first combiner 418 contains the responses to the system interrogations of each guest terminal 22 in the hotel. Therefore, the entertainment system 10 of the first alternative embodiment enables system interrogations to be conducted from a single source while providing two parallel distribution branches, each of which can distribute up to 16 video games. In this way, twice the number of video games can be provided without substantially decreasing the amount of time available for the system interrogations. The system and game interrogations provided to the guest terminals 22 on each branch will appear the same as the interrogations described in the first embodiment.

Although the present invention has been described with reference to preferred embodiments, workers skilled in the art will recognize that changes may be made in form and detail without departing from the spirit and scope of the invention.

What is claimed is:

1. A method for collecting user input information from a plurality of locations using an entertainment system, the entertainment system having a head end system containing a host computer, the entertainment system further having a plurality of terminals, input means coupled to each terminal for enabling a user to input information at each location, and a distribution system linking each terminal to the head end system, the method comprising:

initiating a series of system interrogations to the terminals via the distribution system to obtain information from one of the input means in each system interrogation;

providing collection interrogations to the terminals via the distribution system for obtaining information from the input means including identifying selected terminals of the plurality of terminals to be interrogated by the collection interrogations, wherein information from more than one of the input means can be obtained in each collection interrogation; and interleaving the collection interrogations into the series of system interrogations, including periodically interrupting distribution of system interrogations and initiating collection interrogations via the distribution system during interruption of the distribution of system interrogations.

2. The method of claim 1, including providing input information of a first type from a non-selected terminal to the head end in response to a system interrogation, and providing input information of a second type from the selected terminals to the head end in response to a collection interrogation.

3. The method of claim 2, wherein the head end contains a plurality of program sources and a plurality of interactive sources, the head end being responsive to the input information of the first type to control program source signals to the terminal and being responsive to input information of the second type to provide interactive source signals to the terminal.

4. The method of claim 3, wherein the interactive sources includes a plurality of interactive game generators and the interactive source signals includes interactive game signals.

5. The method of claim 2, including assigning a string response position to each of the selected terminals, the collection interrogations being sent to all of the selected terminals, the input information of the second type being provided by each selected terminal in its respective string response position, the input information provided by the selected terminals forming a string of responses containing input information of the second type to the head end from all of the respective selected terminals.

6. The method of claim 5, including identifying when a terminal ceases to provide input information of the second type, and reassigning the string response position previously assigned to the terminal that ceases to provide input information to another selected terminal having a string response position later in the string than the reassigned string response position.

7. The method of claim 6, including for any selected terminal having more than one string response position, removing the assignment of a string response position that is latest in position in the string.

8. The method of claim 5, including for any selected terminal having more than one string response position, removing the assignment of a string response position that is latest in position in the string.

9. A method for collecting user information from a plurality of locations using an entertainment system, the entertainment system having a head end system containing a host computer, the entertainment system further having a terminal at each of the plurality of locations, each terminal having input means enabling a user to input information, the entertainment system further having a distribution system linking each terminal to the head end system, the method comprising:

initiating a series of system interrogations to the terminals via the distribution system, wherein the system interrogations are directed sequentially to individual terminals;

providing input information of a first type to the head end system for one of the terminals in response to a system interrogation;

identifying selected terminals of the plurality of terminals to provide input information of a second type;

providing input information of the second type to the head end system for the selected terminals of the plurality of the terminals in response to a collection interrogation; and interleaving collection interrogations into the series of system interrogations including periodically interrupting distribution of system interrogations and initiating a collection interrogation to the selected terminals via the distribution system during each interruption of the distribution of system interrogations.

10. The method of claim 9, wherein the head end contains a plurality of program sources and a plurality of interactive sources, the head end being responsive to the input information of the first type to provide program source signals to the terminal and being responsive to input information of the second type to provide interactive source signals to the terminal.

11. The method of claim 10, wherein the interactive sources includes a plurality of interactive game generators and the interactive source signals includes interactive game signals.

12. The method of claim 9, including assigning a string response position to each of the selected terminals, the collection interrogations being sent to all of the selected terminals, the input information of the second type being provided by each selected terminal in its respective string response position, the input information provided by the selected terminals forming a string of responses containing input information of the second type to the head end from all of the respective selected terminals.

13. The method of claim 12, including identifying when a terminal ceases to provide input information of the second type, and reassigning the string response position previously assigned to the terminal that ceases to provide input information to another selected terminal having a string response position later in the string than the reassigned string response position.

14. The method of claim 13, including for any selected terminal having more than one string response position, removing the assignment of a string response position that is latest in position in the string.

15. The method of claim 12, including for any selected terminal having more than one string response position, removing the assignment of a string response position that is latest in position in the string.

16. The method of claim 9, wherein the head end contains a plurality of program sources and a plurality of interactive sources, the head end being responsive to the input information of the first type to provide program source signals to the terminal and being responsive to input information of the second type to provide interactive source signals to the terminal.

17. The method of claim 16, wherein the interactive sources includes a plurality of interactive game generators and the interactive source signals includes interactive game signals.

18. In an entertainment system having a head end system containing a host computer and a plurality of program sources, the entertainment system further having a plurality of terminals and a distribution system linking each terminal to the head end system, each of the terminals being operable to provide input information of a first type to the head end system, the head end system being responsive to the input information of the first type to control program signals to the respective terminal, the method of providing interactive signals to selected terminals of the plurality of terminals comprising:

designing a string response position to each of the selected terminals;

providing input information of a second type from selected terminals to its respective string response position to form a response string containing input information of the second type to the head end from all selected terminals providing input information;

responding at the head end to input information of the second type to provide interactive signals to the respective selected terminals;

identifying when a terminal ceases to provide input information of the second type; and reassigning the string response position previously assigned to the terminal that ceases to provide input information to another selected terminal having a string response position later in the string than the reassigned string response position.

19. The method of claim 18, including for any selected terminal having more than one string response position, removing the assignment of a string response position that is latest in position in the string.

20. The method of claim 18, including for any selected terminal having more than one string response position, removing the assignment of a string response position that is latest in position in the string.

21. The method of claim 18, including providing a plurality of interactive sources at the head end, the interactive sources responding to the input information of the second type to provide the interactive signals to the respective terminal.

22. The method of claim 18, wherein the number of string response positions in the response string is as at least as great as a maximum number of selected terminals.

23. A method for providing interactive signals to a plurality of locations using an entertainment system, the entertainment system having a head end system containing a host computer, the entertainment system further having a plurality of terminals and a distribution system linking each terminal to the head end system, wherein the host computer initiates a series of system interrogations to the terminals via the distribution system, the method comprising:

providing a plurality of interactive signal source connections in the head end system of the entertainment system, for providing interactive signals to the terminals via the distribution system;

providing a controller at each location, the controller being coupled to one of the terminals;

providing collection interrogations to each of the terminals via the distribution system, for obtaining information from the controllers;

interleaving the collection interrogations into the series of system interrogations;

receiving at the head end, via the distribution system, responses to the collection interrogations;

providing responses to the collection interrogations to the interactive signal source connections without providing the responses to the host computer for processing;

operating the respective interactive signal source connection to provide interactive signals as a function of the responses; and displaying information at the locations based upon interactive signals received via the distribution system from the head end system.

24. The method of claim 23 wherein each collection interrogation includes a plurality of response positions for the responses of the terminals to the collection interrogation.

25. The method of claim 24 wherein each of the terminals is assigned a response position in which to respond to each collection interrogation at a time prior to the time that an interactive signal for an information display is provided to the terminal.

26. The method of claim 25 wherein the response position is assigned to the terminal during a system interrogation.

27. The method of claim 25 wherein the number of response positions in a collection interrogation is equal to the number of terminals that are currently being provided with interactive signals from the head end system.

28. The method of claim 25 wherein each of the interactive signal source connections is assigned a response position corresponding to the response position assigned to the terminal to which it provides an interactive signal and wherein each interactive signal source connection processes the collection interrogation response information contained in its assigned response position.

29. The method of claim 28 wherein when a terminal occupying a first response position is taken out of the interactive mode so that its response position is no longer used and wherein another terminal remaining in the interactive mode has a second, later response position, the second terminal and a corresponding interactive signal source connection are reassigned to the first response position.

30. The method of claim 29 wherein the terminal to be reassigned is first assigned to the first response position so that it responds to collection interrogations in both the first and second response positions, and wherein the terminal ceases to respond to collection interrogations in the second response position at a later time.

31. The method of claim 23 wherein system interrogations are not initiated by the host computer while a collection interrogation is being provided to the terminals.

32. An entertainment system for providing interactive signals to a plurality of locations, the entertainment system comprising:

a plurality of terminals;

a host computer capable of initiating a series of system interrogations to the terminals;

a distribution system linking each of the terminals to the host computer;

a plurality of interactive signal source connections linked to the host computer for providing interactive signals to the terminals via the distribution system; and a controller coupled to each of the terminals, wherein the host computer is capable of initiating a series of collection interrogations to each of the terminals via the distribution system for obtaining information from the controllers, the collection interrogations being interleaved into the series of system interrogations, and wherein the interactive signal source connections provide the interactive signals as a function of responses to the collection interrogations received from the terminals via the distribution system without the responses being provided to the host computer for processing.

33. The entertainment system of claim 32 wherein each collection interrogation includes a plurality of response positions for the responses of the terminals to the collection interrogation.

34. The entertainment system of claim 33 wherein each of the terminals is assigned a response position in which to respond to each collection interrogation at a time prior to the time that an input signal for a video collection is provided to the terminal.

35. The entertainment system of claim 34 wherein each of the interactive signal source connections is assigned a response position corresponding to the response position assigned to the terminal to which it provides an interactive signal and wherein each interactive signal source connection processes the collection interrogation response information contained in its assigned response position.

36. The entertainment system of claim 35 wherein the entertainment system further comprises timing means linked to the interactive signal source connections for providing timing signals enabling each interactive signal source connection to determine when its assigned response position occurs.

37. The entertainment system of claim 36 wherein the timing means includes a first microcomputer for receiving the collection interrogations and generating a plurality of timing pulses corresponding with each response position and a second microcomputer.

38. The entertainment system of claim 32 wherein the entertainment system further comprises conversion means linked to the interactive signal source connections for altering the rate at which collection interrogation response information is provided to the interactive signal source connections.

39. The entertainment system of claim 36 wherein the conversion means comprises a microcomputer.

40. The entertainment system of claim 32 wherein the entertainment system further comprises routing means linked to the interactive signal source connections for routing each signal from the host computer to the interactive signal source connections to the specific interactive signal source connection to which it is intended to be received.

41. The entertainment system of claim 40 wherein the routing means comprises signal separation means and a plurality of switches.

42. The entertainment system of claim 40 wherein the signal separation means comprises a microcomputer.

43. An entertainment system for providing user-selected video information to users in a plurality of different rooms, the entertainment system comprising:
   a head end which includes:
   a host computer;
   a modem;
   a video player system having a plurality of outputs;
   an interactive signal source connection system having a plurality of outputs;
   an array of RF modulators having inputs for receiving outputs from the video player system and the interactive signal source connection system and having outputs;
      a combiner having an output and having a plurality of inputs for connection to the outputs of the RF modulators and an output of the modem;
      a two-way master antenna television (MATV) distribution system connected to the head end; and
   an in-room system in each room which includes:
      a television;
      an interactive signal controller;
      a remote control; and
      a terminal connected to the MATV distribution system and to the television for controlling operation of the television based upon signals received via the MATV distribution system from the head end and for sending signals via the MATV distribution system to the head end based upon input signals received from the interactive signal controller and the remote control;
      wherein the interactive signal source connection system includes an array of interactive signal source connections;
      wherein the host computer assigns one of the interactive signal source connections to one of the rooms based upon a signal received from that room over the MATV distribution system; and
      wherein the interactive signal source connection assigned to one of the rooms supplies interactive signals as a function of input signals received via the MATV distribution system from the interactive signal controller of that room, without having the interactive signals provided to the host computer for processing.

44. The entertainment system of claim 43 wherein each of the interactive signal source connections has an output connected to an input of a different one of the array of RF modulators.

45. The entertainment system of claim 43 wherein the head end further includes:
   a diplexer having an input connected to the output of the combiner, an output connected to an input of the modem, and a two-way port connected to the MATV distribution system.

46. A method for providing interactive signals to a plurality of locations using an entertainment system, the entertainment system having a head end system containing a host computer, the entertainment system further having a terminal and associated video display at each of the locations and a distribution system linking each terminal to the head end system, the method comprising:
   providing a plurality of interactive signal source connections in the head end system of the entertainment system for providing interactive signals via the distribution system to the terminals;
   providing an interactive controller at each location, the interactive controller being coupled to the terminal at that location;
   obtaining, via the distribution system, input signals from the interactive controllers;
   providing a path for the input signals such that the information is provided to the interactive signal source connections without being provided to the host computer for processing;
   providing the interactive signals by the interactive signal source connections as a function of the input signals; and
   displaying interactive information on the video displays as a function of the interactive signals.

47. An entertainment system for providing display of interactive information to a plurality of rooms, the entertainment system comprising:
   a distribution system;
   a terminal, a television, and a controller located at each of the plurality of rooms, the television displaying interactive information as a function of interactive signals received by the terminal, the controller providing input information to the terminal, and the terminal connected to the distribution system for receiving the interactive signals and for transmitting signals representing the input information; and
   a head end connected to the distribution system and including a host computer and a plurality of interactive signal source connections, the host computer controlling which terminal is connected to which interactive signal source connections, and each interactive signal source connection being capable of providing the interactive signals as a function of the input information received from the terminal connected to that interactive signal source connection, the input information is provided to the interactive signal source connection without being provided to the host computer for processing.

* * * * *